United States Patent

Hinrichs et al.

[15] 3,665,430

[45] May 23, 1972

[54] DIGITAL TAPE ERROR RECOGNITION METHOD UTILIZING COMPLEMENTARY INFORMATION

[72] Inventors: Kurt Hinrichs; Gerd Wilken, both of Coburg, Germany

[73] Assignee: ERC Electronic Research Corporation, Basel, Switzerland

[22] Filed: Feb. 16, 1970

[21] Appl. No.: 11,805

[30] Foreign Application Priority Data

Feb. 18, 1969 Germany ........................P 19 08 060.5

[52] U.S. Cl. ..........340/174.1 H, 340/146.1 BE, 340/174.1 G

[51] Int. Cl. ......................................G11b 5/02, G06f 11/12

[58] Field of Search..............340/174.1 A, 174.1 B, 174.1 G, 340/174.1 H, 146.3 WD, 146.3 M, 146.1 BE, 146.3 Z; 179/100.2 MI, 100.2 S

[56] References Cited

UNITED STATES PATENTS

| | | | |
|---|---|---|---|
| 3,238,501 | 3/1966 | Mak et al. | 340/146.1 |
| 3,237,157 | 2/1966 | Higby, Jr. | 340/146.1 |
| 3,528,017 | 9/1970 | Zussman | 340/174.1 B |
| 3,414,816 | 12/1968 | Tobey et al. | 340/174.1 B |
| 2,944,248 | 7/1960 | Auerbach et al. | 340/174.1 B |

*Primary Examiner*—Bernard Konick
*Assistant Examiner*—Vincent P. Canney
*Attorney*—Spencer & Kaye

[57] ABSTRACT

A method for recognizing errors appearing during the playback of digital tape recordings by recording the digital information on one track of a tape and complementary information on the other track of the tape, the complementary information being constituted by pulses which occur during every period when no pulse appears on the information track, and combining the signals in the two tracks during playback to form a reference clock pulse train.

1 Claim, 15 Drawing Figures

INVENTORS.
Kurt Hinrichs
Gerd Wilken
BY Spencer & Kaye
ATTORNEYS.

INVENTORS:
KURT HINRICHS
GERD WILKEN

BY Spencer & Kaye
ATTORNEYS.

INVENTORS.
Kurt Hinrichs
Gerd Wilken
BY
Spencer & Kaye
ATTORNEYS.

INVENTORS.
KURT HINRICHS
GERD WILKEN
BY Spencer & Kaye
ATTORNEYS.

INVENTORS.
KURT HINRICHS
GERD WILKEN

BY Spencer & Kaye
ATTORNEYS.

DIGITAL TAPE ERROR RECOGNITION METHOD UTILIZING COMPLEMENTARY INFORMATION

BACKGROUND OF THE INVENTION

The present invention relates to a method and associated apparatus for the recognition of errors which occur during the playback of digital tape recordings due to the occurrence of spurious pulses or due to variations in tape synchronization.

In order to achieve a distortion-free reproduction of such digital tape recordings, the signal pulses must have a constant repetition period. This can be accomplished, as is well known, by causing the tape to advance past the reading head at a constant velocity and by moving the tape during playback at a speed equal to the speed at which it was advanced during recording.

One manner in which the necessary synchronization could be achieved during playback would be by positively mechanically connecting the recording transport mechanism with the playback transport mechanism, for example by employing punched tape having transport holes which cooperate with a transport sprocket wheel. However this requires a substantial amount of mechanical structure, is relatively complicated, and limits the flexibility of use of such tapes.

Another manner of achieving synchronization during playback involves recording, on a second track of the tape, a reference timing pulse train. A simultaneous playback of both the data and reference tracks and comparison of the two permits an accurate reproduction of the original information. These results can be achieved satisfactorily if the timing pulses are of substantially shorter duration than the information pulses and if each timing pulse occurs entirely during the period of its associated information pulse. These conditions can be satisfied only with very expensive and accurately adjusted equipment because all of the components associated with the tape drive and transport mechanisms must have high mechanical precision.

SUMMARY OF THE INVENTION

It is a primary object of the present invention to overcome these drawbacks and difficulties.

Another object of the invention is to simplify and improve the synchronization of tape playback with the original recording.

Still another object of the invention is to detect the appearance of spurious pulses during playback.

These and other objects according to the invention are achieved by recording the desired information with a certain pulse repetition rate on one track of a tape and simultaneously recording, on a second track of the tape, a complementary pulse train. The complementary pulse train is one in which during each pulse period the signal is the complement of that appearing on the information track. With such a recording, a combination of the two tracks will produce a reference clock pulse train. In further accordance with the invention, the information on the two tracks is in fact combined during playback to provide the necessary clock pulse train.

The method according to the invention presents two major advantages. Firstly, the signals on the two tracks need not have as accurate a time coincidence as in the case of prior art reference timing tracks since time variations will only vary the spacing between individual pulses, but not the average number of pulses, which is determinative of the synchronization speed. Secondly, it is the provision of a complementary pulse train on the second track of the tape which permits an error detection to be accomplished. In contrast with reference timing tracks in which a "L" (L is here employed to represent a binary "1") becomes a "0" if an information pulse is missing or a "0" becomes a "L" if a spurious pulse occurs simultaneously with a clock pulse, the use of the complementary information can only result in a change in the total number of pulses, that is a "L" or a "0" may be added or lost. This type of error can be detected very easily simply by counting the pulses read from the two tracks.

To precisely identify the information pulse group which belongs to a given character, composed of a plurality of bits, the beginning and end of each pulse group, also referred to as a "-pulse block," are distinguished by special check pulses. The check pulses are produced by recording pulses simultaneously on both tracks of the tape and can then be detected, during playback, at the output of an AND gate to which the signals from both tracks are connected.

DESCRIPTION OF THE PREFERRED EMBODIMENTS

Figures 1, 2:
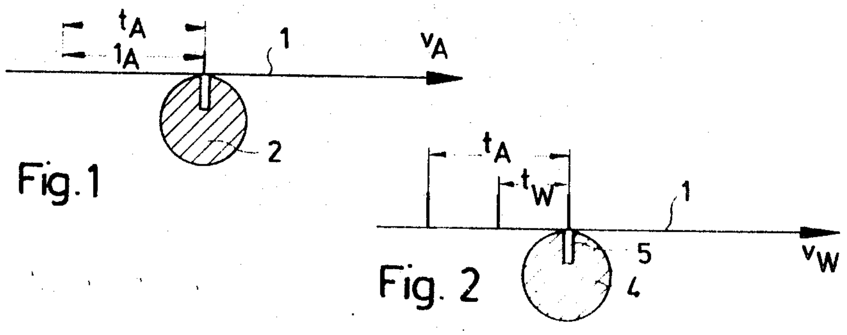
FIG. 1 is a pictorial view of the passage of a tape past the recording head.
FIG. 2 is a view similar to that of FIG. 1 of the passage of the tape past the playback head.

FIG. 1 illustrates a magnetic tape 1 which is pulled past the gap 3 of a recording head 2 at a speed $v_A$. The recording time $t_A$ is here the factor determining the recorded character length $l_A$. The recording is to be made with a clock period of $t_f$.

One prerequisite for a distortion-free playback of the recorded signal is that the information on a tape length $l_A$ be brought past the annular gap 5 of the reading head 4 (FIG. 2) at the same tape speed $v_A$. Only then can the information be read without distortions because the duration of the individual characters constituting the information will be the same as during recording.

If, however, the magnetic tape 1 is brought past annular gap 5 at a higher tape speed $v_w$ during playback, as shown in FIG. 2, the playback time for the individual signals recorded on each tape length $l_A$ is only $t_w$ and a plurality of signals appear during the clock period $t_f$ so that it is no longer possible to correctly play back the recording and erroneous information is reproduced.

Figure 3:
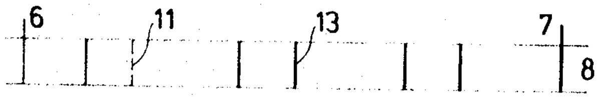
FIG. 3 is a pictorial representation of a portion of an original recording.
Figure 4:
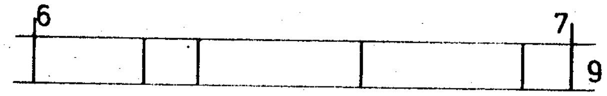
FIG. 4 is a view similar to that of FIG. 3 of the complementary recording corresponding to the original recording shown in FIG. 3.

To eliminate this drawback and, furthermore, to permit the recognition of errors occurring during playback due to an additional pulse or the lack of a pulse, a second recording head records, during the recording process, the information 9 (FIG. 4), which is complementary to the pulses constituting the original information 8 (FIG. 3), on the same tape. In addition, at the beginning and at the end, respectively, of each pulse group check pulses 6 and 7 are recorded.

Figure 5:
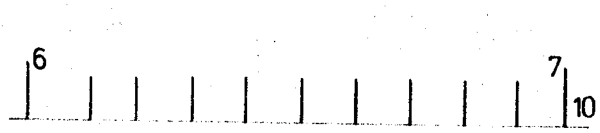
FIG. 5 is a view similar to that of FIG. 3 of the reference timing track combined from the two tracks of FIGS. 3 and 4 during playback.

If now the playback should occur at a playback speed different from the recording speed, the pulses will occur at different intervals. In order to obtain a reference timing track for the synchronization of the playback process, the pulses of the two tracks 8 (FIG. 3) and 9 (FIG. 4) can be combined electronically into the pulse sequence 10 (FIG. 5) of regularly spaced clock pulses.

Figure 6:
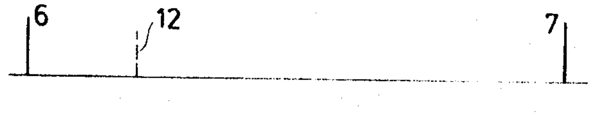
FIG. 6 is a view similar to that of FIG. 3 of a check pulse sequence.

If an additional spurious pulse 11 (FIG. 3) should then appear during the reading, or playback, of the information track 8, which pulse coincides in time with a pulse of the complementary track 9, it is evaluated as a check pulse 12 (FIG. 6). If, however, the spurious pulse should fall between two clock pulses, it is counted along with the pulses and increases the total number of pulses. If, on the other hand, pulse 13 is missing from the information 8 during playback, the total number of pulses will be correspondingly reduced.

The same results occur in the case where such spurious pulses appear on the complementary track 9.

Figure 7:
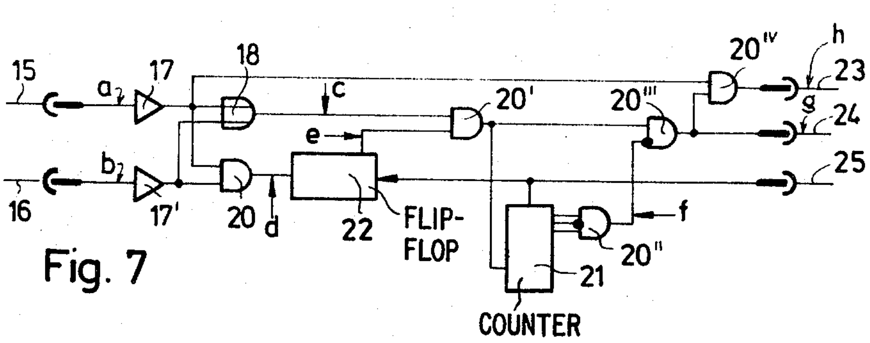
FIG. 7 is a circuit diagram of the principal components of a device for performing the method according to the present invention.

The desired error recognition may be accomplished, for example, with the aid of the circuit of FIG. 7 wherein line 15 is the readout current path for the information track 8 and line 16 is the readout current path for the complementary track 9. Lines 15 and 16 are connected, by suitable jacks, to the inputs of respective amplifiers 17 and 17'. Each amplifier has its output connected to an input of an OR gate 18 and an input of an AND gate 20 so that both amplifiers are connected to both gates. The output of gate 18 is connected to one input of an AND gate 20' while the output of gate 20 is connected to one input of a flipflop 22. The output of flipflop 22 is connected to the other input of AND gate 20'. The output of AND gate 20' is connected to the input of a counter 21 having outputs connected to the inputs of a further AND gate 20''. The output of AND gate 20'' is connected to one input of another AND gate 20''' whose other input is connected to the output of AND gate 20'. The output of gate 20''' is connected to one input of a final AND gate $20^{IV}$ whose other input is connected to the output of amplifier 17. The output of gate $20^{IV}$ is connected to an output terminal 23 at which the information appears, and the output of gate 20''' is connected to an output terminal 24 at which the clock pulse train appears. Finally, an output of counter 21 is connected to an output terminal 25 for stop pulses and to the other input of flipflop 22.

Figure 8:
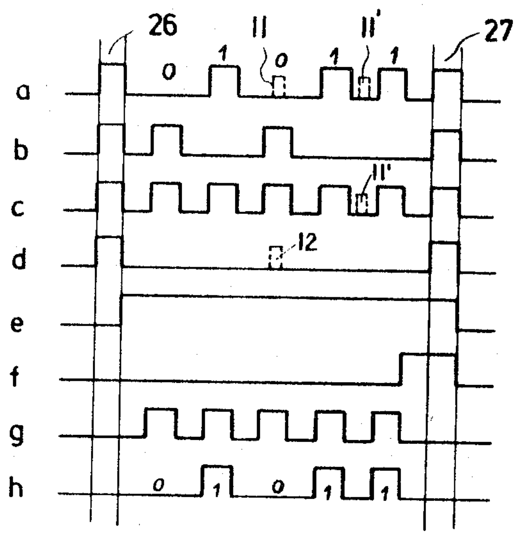
FIG. 8 shows pulse diagrams employed in explaining the method according to the invention.

The operation of the circuit of FIG. 7 will be described with reference to the diagrams of FIG. 8 showing the signal waveforms appearing at different points in the circuit for an information signal having the form illustrated at *a* in FIG. 8.

The signal appearing at the output of AND gate 20 is indicated by the waveform *d* of FIG. 8. A pulse will appear at this output only when pulses occur simultaneously on both tracks of the tape. This will occur at the beginning and end of each data word, represented by the start pulse 26 and the stop pulse 27, and also whenever a spurious pulse occurs in the information track a in time coincidence with a complementary pulse in track *b*. One such possible pulse is shown in broken lines as the pulse 11 in the waveform of track *a*, and the corresponding check pulse 12 at the output of gate 20 is shown in waveform *d*. The signal at the output of flipflop 22 is indicated by the waveform *e* of FIG. 8 and determines the counting period for each data word. The waveform *f* represents the counter output at which a pulse appears when the counter counts one pulse more than the number of pulses in each data word. In this case, for a signal word of five bits, the counter will produce an output when it has counted a "6."

In order to avoid the difficulties previously encountered in those arrangements employing a clock pulse track, wherein the duration of each clock pulse must be shorter than that of its associated information pulse and must occur entirely during the period of the information pulse, the recognition of check pulses according to the invention simply requires that the two pulses applied to gate 20 overlap in time.

The check pulses clearly establish the counting range for achieving an error detection. The first check pulse, produced by starting pulses 26, causes an enabling signal *e* to be applied to one input of gate 20' so that all of the pulses from both tracks are delivered to, and counted by, counter 21.

During counting, a continuous comparison is made with the check pulse recognition unit, constituted essentially by gate 20. The counter is preset to achieve a count of one more than the total number of pulses in each data word, i.e., the total number of pulses between a start pulse 26 and a stop pulse 27. Thus, if the length of each pulse block is n bits and each pulse block is delimited by a start pulse and a stop pulse, no pulse can appear simultaneously on both tracks during the interval between the first pulse and the $n^{th}$ pulse after the start pulse, or the first check pulse. However, the $(n+1)^{th}$ pulse must appear simultaneously on both tracks, this being the second intended check pulse, or the stop pulse.

If an additional spurious pulse occurs during an interval between pulses, such as the spurious pulse 11' shown in FIG. 8, a total of $n+1$ pulses will be counted by counter 21 and the second check pulse, or stop pulse, will appear as the counter reaches the count of $n+2$. If, on the other hand, a pulse should be lost during playback, the counter will only count $n-1$ pulses during each pulse block and the stop pulse will appear when the counter reaches a count of $n$.

Since the stop pulse should appear when the counter is at a count of $n+1$, very simple logic circuitry could be used to determine when the stop pulse coincides with a count other than $n+1$ and hence when an error has appeared.

Thus, it is possible to recognize practically all types of single errors, i.e., errors in which only one pulse deviates from the correct value. In the case of more complicated double errors in which, due to the simultaneous appearance of one spurious pulse and absence of another pulse, the total number of pulses will equal $n$, a pair test could additionally be employed to detect the major portion of errors of this type.

Figure 1A:
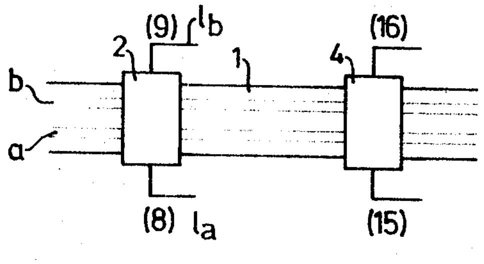
FIG. 1*a* is a plan view of the passenge of a tape with two magnetic tracks past a recording head and a playback head.

FIG. 1*a* illustrates a magnetic tape 1, which runs past a recording head 2 and a playback head 4. This recording head comprises two annular gaps 3*a* and 3*b* (FIG. 1*b*), recording two tracks *a* and *b* on the magnetic tape 1. The playback head 4 comprises two annular gaps too (not shown), which look like gaps 3*a* and 3*b*.

Figure 1B:
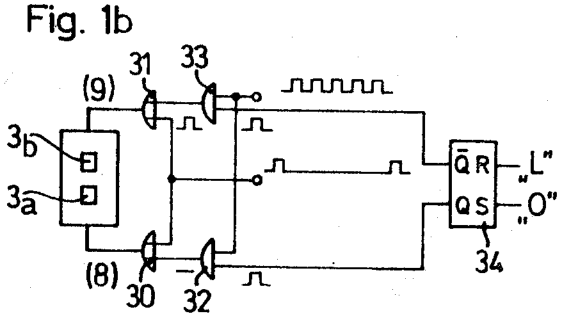
FIG. 1*b* is a view of the recording head, showing its annular gaps, and of the logical circuit, generating the complementary pulses.

The pulses, including complementary and check pulses, which are to be recorded on the magnetic tape by recording head 2 are generated in a logical circuit (FIG. 1*b*). This circuit comprises two OR gates 30 and 31, two AND gates 32 and 33 and a flipflop 34. The information pulses are applied to the set and reset inputs of flipflop 34. The outputs of this flipflop are connected with each first input of AND gates 32 and 33, the second inputs of which are connected with a clock pulse source. The outputs of these AND gates 32 and 33 are connected with the first input of each OR gate 30 and 31, the second inputs of which are connected with a pulse source, generating the checkpulses. The outputs of OR gates 30 and 31 are connected with the recording head 2, respective its annular gaps 3*a* and 3*b*.

At the outputs Q and $\overline{Q}$ respective appear the information pulses and their inverted ones. These pulses are triggered by the pulses of the clock source at AND gates 32 and 33 in such a manner that at the outputs of these gates the information pulses, respectively the complementary pulses appear. These pulses are completed with the checkpulses at OR gates 30 and 31 and are then applied to recording head 2.

Figure 9:
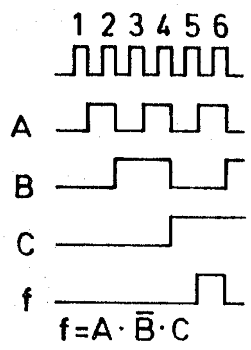
FIG. 9 is a pulse diagram, showing the outputs of the counter and the generating of the *f*-signal.

The counter 21 comprises three flipflops A, B, C, the outputs of which are connected with the three inputs of AND gate 20''. One of these three inputs of this gate is inverted. FIG. 9 shows the signals at the three outputs A, B, C of counter 21 in time relation to the pulses appearing at the output of AND gate 20'. The term for producing a signal at the output of AND gate 20' is $f = A\,\overline{B}\,C$.

The meaning of that equation is, that an output pulse *f* at AND gate 20'' is only produced, after the counter has counted to 5. This pulse *f* cuts off NAND gate 20''' and no further pulse appears at 23 and 24. The following edge of the stop pulse 27 causes the counter to count to 6 and to apply a stop pulse to line 25. This line 25 is connected with the edge triggered reset input of flipflop 22, the edge-triggered set input of which is connected with line *d*. The stop pulse of counter 21 resets flipflop 22 and the next pulse group can be applied at lines 15 and 16.

Figure 10:
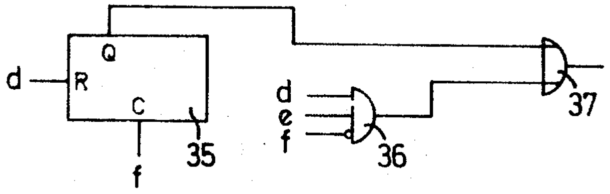
FIG. 10 shows a circuit which generates an alarm signal, if a fault in an information pulse group is recognized.

FIG. 10 shows a logical circuit producing an alarm signal, if there are more or less than five information and complementary pulses in a pulse group. This circuit consists of an edge triggered flipflop 35 having two inputs C and R which are connected with line f and line d of FIG. 7. A pulse *d* at input R keeps flipflop 35 in the reset state. If there is applied a pulse *f* at input C at the same time, no change in the state of the flipflop occurs. But if pulse d has disappeared, a pulse *f* at input C causes the flipflop to switch and at output Q a binary signal "L" appears.

Furthermore the said circuit comprises an AND gate 36 with three inputs *d*, *e* and *f* the last of which is inverted. These three inputs are connected with the correspondent lines of FIG. 7. The outputs of AND gate 36 and of flip-flop 35 are combined in an OR gate 37. An output signal "L" of AND gate 36 or an output signal "L" of flip-flop 35 produce an output signal at OR gate 37 which acts as an alarm signal and causes, for instance, a repeated reading of the last information pulse group. Flipflop 35 recognizes a first kind of faults, indicated as F1 in FIG. 11*a*. And gate 36 recognizes a second and third kind of faults, indicated as F2 and F3 in FIG. 11*b* and 11*c*.

Figure 11A:
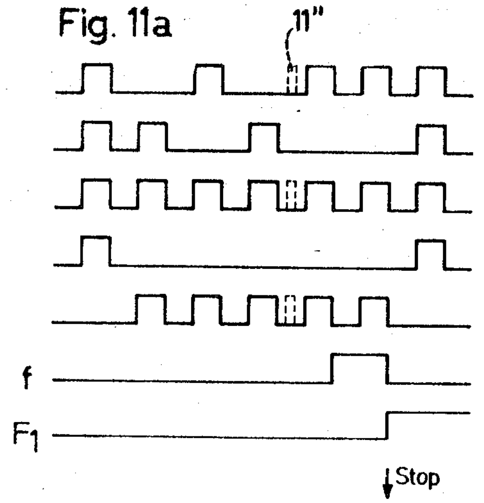
FIGS. 11*a*, 11*b*, 11*c* are pulse diagrams, showing three potential faults, which can be recognized by the method and the device for performing the method according to the invention.

FIG. 11*a* shows a pulse diagram, having an additional spurious pulse 11' of the first kind of faults in information track *a*. This pulse 11' even appears at waveform *c* and at waveform *g* but it appears not at waveform *d*. This pulse 11' is included in the account by counter 21 and causes the counter to produce a pulse *f* after the forth of the correct pulses. After the fifth of the correct pulses pulse *f* disappears, while the second stop pulse 27 had not yet appeared on line *d*. As the pulses *d* and *f* are not coincident at the inputs R and C of flip-flop 35 the flipflop is set and an output signal "L," indicating an alarm, is produced.

Figure 11B:
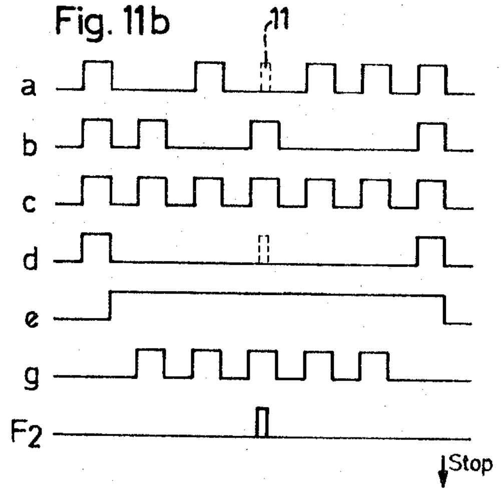

FIG. 11*b* shows a pulse diagram having an additional spurious pulse 11 of the second kind of faults in information track a which coincides with a pulse in complementary track *b*. This spurious pulse is overlapped by the corresponding pulse in the complementary track *b*. Therefor there is no additional spurious pulse in waveform *c*, but this spurious pulse appears in waveform *d*. As explained above flipflop 22 cannot be reset by a pulse on line *d*, so that the positive potential on line *e* remains existent. As it must be a fault, if a pulse *d* appears while no pulse *f*, but a pulse *e* is existent at the same time, AND gate 36 produces an output signal "L" which indicates alarm.

Figure 11C:
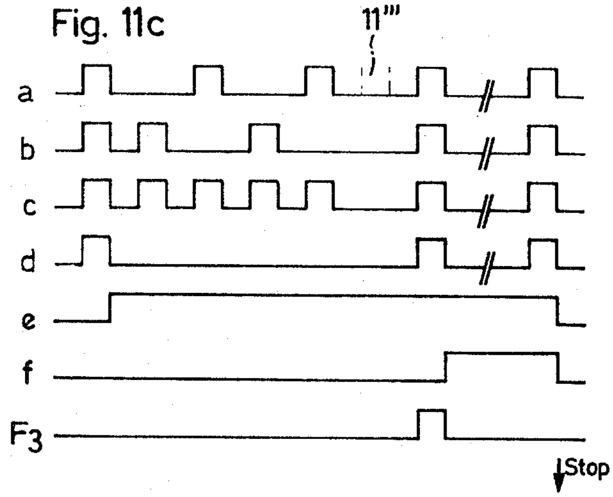

A third kind of faults are shown in the pulse diagram of FIG. 11*c*. One pulse 11''' of the five information and complementary pulses was lost. The counter 21 counts to 5 only, when the second check pulse 27, i.e., the stop pulse, appears on line *d*. At this moment there is a pulse on line *d*, a pulse on line *e*, but no pulse on line *f*. Consequently AND gate 36 produces an output signal "L" indicating alarm. After that the following edge of the stop pulse produces the pulse *f*, while flip-flop 22 remains in its set state and causes pulse *e* remaining existent. This state lasts until the first check pulse of the next information pulse group appears. The reason for that is that the tape still continues running until the stop impuls of the counter appears on line 25. When the first check pulse of the next information pulse group appears, the counter counts to 6 and produces a stop pulse by which flipflop 22 is reset. Now the tape is stopped.

It will be understood that the above description of the present invention is susceptible to various modifications, changes and adaptations and the same are intended to be comprehended within the meaning and range of equivalents of the appended claim.

We claim:

1. A method for detecting errors which occur during the playback of digital magnetic tape recordings due to the appearance of spurious pulses, or due to the disappearance of a pulse, or due to synchronization variations, which tape has one track recorded with the digital information in the form of a series of pulse blocks each containing a predetermined number of bits to be reproduced, comprising the steps of: recording on a second track of the tape a train of pulses complementary to the recorded information; simultaneously recording, at identical points on both tracks, pulses corresponding to the beginning and end of each pulse block; combining both tracks during playback to form a reference clock pulse train and; counting each occurrence of a pulse on either track during each period between the beginning and end of each pulse block.

* * * * *